March 30, 1943.  E. G. WHITE  2,315,146

MULTIPLE CHAIN ASSEMBLY

Filed Aug. 1, 1942

INVENTOR:
EARL G. WHITE,
BY John E. Jackson
HIS ATTORNEY.

Patented Mar. 30, 1943

2,315,146

UNITED STATES PATENT OFFICE 2,315,146

MULTIPLE CHAIN ASSEMBLY

Earl G. White, Hobart, Ind.

Application August 1, 1942, Serial No. 453,273

2 Claims. (Cl. 294—65.5)

This invention relates to improvements in multiple chain assemblies of the character generally employed for suspending lifting magnets and the like, and more particularly relates to a three chain assembly therefor.

My invention provides against twisting of the chains of such an assembly to thereby eliminate the side strains and wear thereon, to minimize the hazard of failure of the chains in service.

Further objects and advantages of the invention will appear from the following description taken in connection with the accompanying drawing wherein:

Fig. 3 is a cross-section taken on the line III—III of Fig. 1, indicating the connection of the assembly with a magnet or the like.

Figure 1:
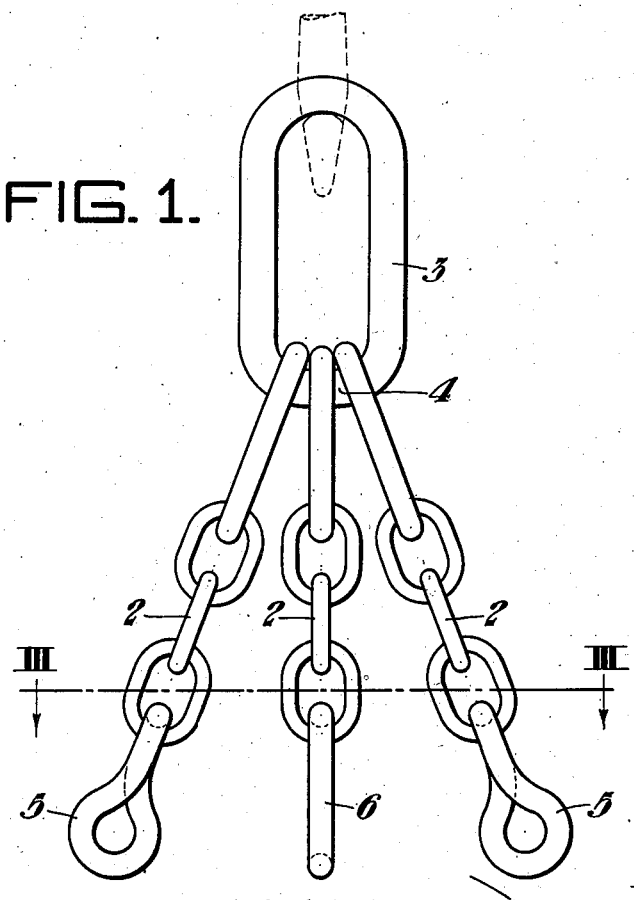
Fig. 1 is an elevational view of a three chain assembly embodying my invention.

Referring to the drawing, the usual multiple chain assembly includes three equal arms or chains 2 engaged with and freely suspended from a common lifting eye or crane link 3, all of the chains 2 being carried by the lower portion 4 of said link 3. In present practice, the three chains or arms 2 are connected by their free terminal links with provided pins on the magnet or other device to be suspended by the device, said pins being spaced 120 degrees apart to equalize the load upon the assembly.

Each chain 2 formerly had aligned end links, or in other words, said chains contained an odd number of links, as shown by the center chain in Fig. 1. Hence, when connecting the device, as formerly employed, to pins spaced 120 degrees apart on the magnet or the like, two of the chains necessarily underwent a twist about their respective axes, thereby placing a strain on the chains, tending to unbalance the entire assembly. Such twisted chains cause chain link fracture under load and are a continual hazard to the workmen.

Figure 4:
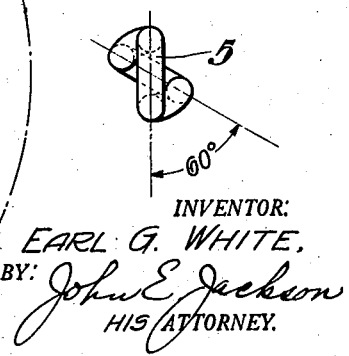
Fig. 4 is a detail view of one of the chain end links.

To eliminate such hazard, I provide the end links 5 of the two outer chains 2 with a partial twist, said links having the endmost portions thereof twisted in opposite directions through an angle of about 60 degrees about the longitudinal axes of the links, as shown in Fig. 4.

Figure 2:
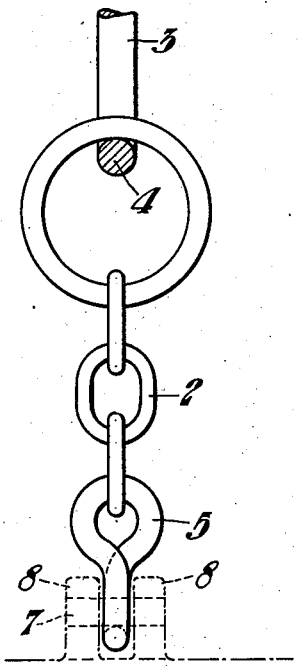
Fig. 2 is a side view of one of the chains.
Figure 3:
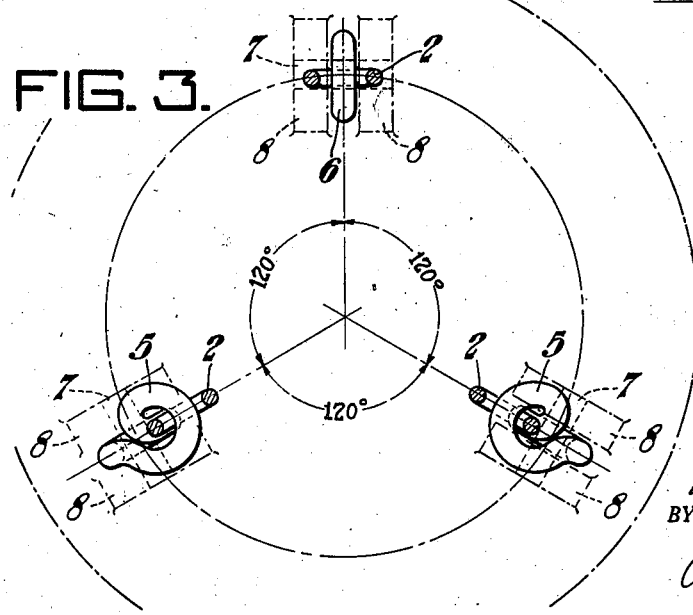

Thus, when applying the chain assembly to a lifting magnet or the like, the center chain may be secured to one pin by its untwisted straight end link 6, and the reversely twisted end links 5 of the other chains engaged with their respective pins on the magnet, the general outline of the latter being indicated by the dot-dash lines of Fig. 3 with the link pins illustrated at 7 and their mounting lugs or ears at 8, the entrance of a link between said lugs being shown in Fig. 2.

My invention is readily incorporated in existing multiple chain assemblies as well as in new constructions by imparting the proper twist to the chain end links as herein set forth, thereby disposing all three chains 2 in untwisted relation for uniformly suspending the weight of the magnet or the like from a crane hook.

Various changes and modifications are contemplated within the scope of the following claims.

I claim:

1. A multiple chain assembly including a common lifting link, three chains suspended therefrom, the free end links of two of said chains being twisted through an angle of about 60 degrees about the longitudinal axes of the links, as and for the purposes described.

2. A multiple chain assembly including a common lifting link, three chains of equal length each having an odd number of links therein, said chains engaging said common link in side-by-side relation, the two outer chains having their free end links oppositely twisted through an angle of about 60 degrees about the longitudinal axes of the links as and for the purposes described.

EARL G. WHITE.